(12) United States Patent
Ananthanarayanan et al.

(10) Patent No.: US 7,085,909 B2
(45) Date of Patent: Aug. 1, 2006

(54) METHOD, SYSTEM AND COMPUTER PROGRAM PRODUCT FOR IMPLEMENTING COPY-ON-WRITE OF A FILE

(75) Inventors: Rajagopal Ananthanarayanan, Milpitas, CA (US); Ralph A. Becker-Szendy, Los Gatos, CA (US); Robert M. Rees, Los Gatos, CA (US); Randal C. Burns, Washington, DC (US); Darrell D. E. Long, Soquel, CA (US); Jujjuri Venkateswararao, Beaverton, OR (US); David M. Wolfe, Portland, OR (US); Jason C. Young, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 10/427,403

(22) Filed: Apr. 29, 2003

(65) Prior Publication Data
US 2004/0221125 A1    Nov. 4, 2004

(51) Int. Cl.
*G06F 12/00* (2006.01)
(52) U.S. Cl. ............... 711/202; 711/162; 711/206
(58) Field of Classification Search ........ 711/161–162, 711/168, 202–203, 205–207; 707/200–205; 714/1–7
See application file for complete search history.

(56) References Cited

U.S. PATENT DOCUMENTS

| 5,293,597 A | * | 3/1994 | Jensen et al. ............... 711/207 |
| 5,379,391 A | | 1/1995 | Belsan et al. ............... 711/114 |
| 5,729,710 A | | 3/1998 | Magee et al. ............... 711/203 |
| 5,893,155 A | | 4/1999 | Cheriton ...................... 711/144 |
| 6,014,728 A | | 1/2000 | Baror .......................... 711/133 |
| 6,075,938 A | | 6/2000 | Bugnion et al. ............... 703/27 |
| 6,081,875 A | | 6/2000 | Clifton et al. ............... 711/162 |
| 6,112,285 A | | 8/2000 | Ganapathy et al. ......... 711/207 |
| 6,212,601 B1 | | 4/2001 | Shiell .......................... 711/118 |

(Continued)

OTHER PUBLICATIONS

Burns, R., "Data Management In A Distributed File System For Storage Area Networks", University of California Santa Cruz, Mar. 2000, pp. 1-150.

(Continued)

*Primary Examiner*—Nasser Moazzami
(74) *Attorney, Agent, or Firm*—Abdy Raissinia, Esq.; Kevin P. Radigan, Esq.; Heslin Rothenberg Farley & Mesiti, P.C.

(57) ABSTRACT

Various copy-on-write implementations for a computing environment are presented. One copy-on-write implementation includes employing a read mapping table to perform a first virtual block to physical block mapping for use in reading a block of data of a file to be copy-on-written from physical storage for modification; and employing a different, write mapping table to perform a second virtual block to physical block mapping for use in writing a modified block of the file data to physical storage, wherein copy-on-write of the block of data is achieved using a single write operation. In another implementation, a distributed copy-on-write of a file for a client server environment is presented. This distributed copy-on-write includes performing, by a first client, copy-on-write of at least one block of data of the file to be copy-on-written, and performing, by a second client, copy-on-write of at least one other block of data of the file, wherein multiple clients perform the copy-on-write of the file.

55 Claims, 8 Drawing Sheets

U.S. PATENT DOCUMENTS 6,219,770 B1    4/2001    Landau ........................ 711/162
6,289,356 B1    9/2001    Hitz et al. ................... 707/201

OTHER PUBLICATIONS

Use of Hardware Address Compare Function to Implement Copy on Write, IBM Technical Disclosure Bulletin, vol. 38, No. 11, Nov. 1995, pp. 59.

IBM Storage Tank™ A Distributed Storage System, IBM Corporation, Jan. 24, 2002, "www.Almaden.Ibm.com/StorageSystems/file_Systems/Storage_tank/ExtStorageTankPaper01_24.02.pdf".

Maguire, G.Q., Jr., et al., "Effects of copy-on-write memory management on the response time of UNIX fork operations", Computing Systems, vol. 1, No. 3, pp. 225-278, Summer 1988.

Nelson, M., et al., "Copy-on-write for Sprite (operating system)", Proceedings of the Summer 1988 USENIX Conference, pp. 187-201, Berkeley, CA, USA, 1988, pp. ix+398, B01.

\* cited by examiner

| FILE REPRESENTATION 200 | |
|---|---|
| RANGE/ OFFSET | VIRTUAL/ RELATIVE BLOCK # |
| 0–4K | 1 |
| 4–8K | 2 |
| 8–12K | 3 |
| 12–16K | 4 |
fig. 2
| FILESYSTEM MAPPING TABLE 300 | |
|---|---|
| VIRTUAL/ RELATIVE BLOCK # | PHYSICAL BLOCK ADDRESS |
| 1 | A |
| 2 | D |
| 3 | G |
| 4 | L |
fig. 3
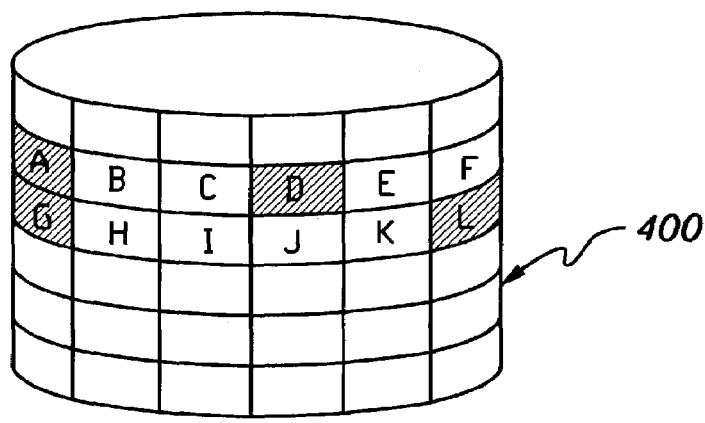
fig. 4
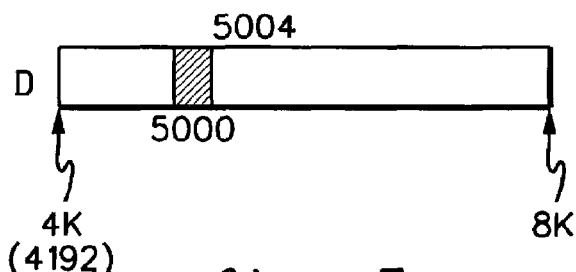
fig. 5

READ MAPPING TABLE 900
| VIRTUAL BLOCK # | PHYSICAL BLOCK # |
|---|---|
| 1 | A |
| 2 | D |
| 3 | G |
| 4 | L |
WRITE MAPPING TABLE 910
| VIRTUAL BLOCK # | PHYSICAL BLOCK # |
|---|---|
| 1 | W |
| 2 | X |
| 3 | Y |
| 4 | Z |
*fig. 9*
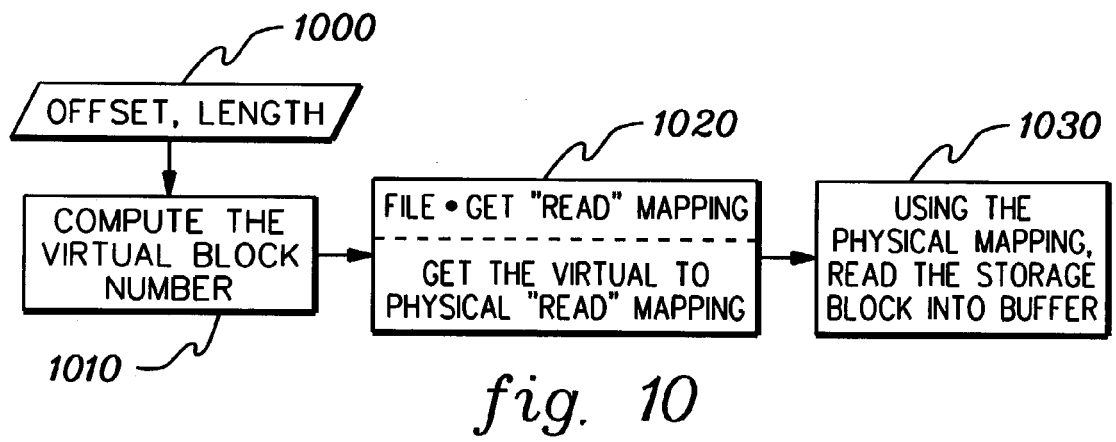
*fig. 10*
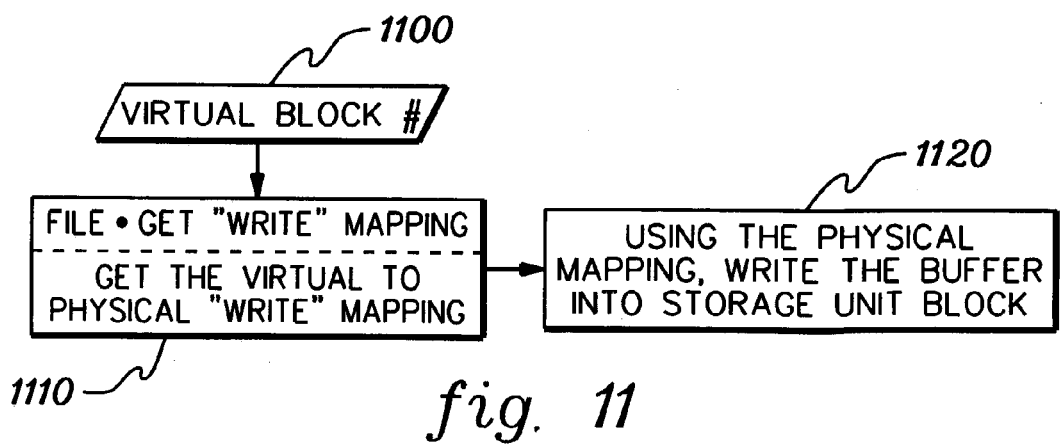
*fig. 11*

METHOD, SYSTEM AND COMPUTER PROGRAM PRODUCT FOR IMPLEMENTING COPY-ON-WRITE OF A FILE

TECHNICAL FIELD

The present invention relates generally to filesystem data management within a computing environment, and more particularly, to techniques for implementing a copy-on-write of a filesystem data file within various computing environments.

BACKGROUND ART

Many types of computing environments, including general purpose computers and data processing systems, employ storage organized using a "virtual memory" scheme. A general virtual memory allows applications and/or processes that are executing in a computing environment to behave as if they have an unlimited amount of memory at their disposal. In actuality, the amount of storage available to a particular application or process is limited by the amount of storage in the computing environment and further limited by the number of concurrently executing programs sharing that storage. In addition, a virtual memory scheme hides the actual physical address of memory from the application programs. Application programs access their memory space using a logical address, which is then converted to a physical address by the computing environment.

A virtual memory system organizes storage in units called "blocks" (or "pages"). These blocks are moved between a fast, primary memory and one or more larger and usually slower secondary, tertiary, etc. storage units. The movement of blocks (often called swapping) is transparent to the applications or processes that are executed in the computing environment, enabling the applications or processes to behave as if they each have an unlimited amount of storage.

Certain conventional systems occasionally need to copy portions of memory. This copying can either be user-initiated or initiated by an operating system. Conventional systems often use a "lazy" copy method for a "flash copy" in which the storage to be copied is assigned a status of read-only, but the actual copy is deferred until later. If an attempt is made to write into either the original or the copy, then the memory is copied at that time and both the original and the copy are given an input/output (I/O) status of read-write. In this way, it appears that a copy was made immediately, but the actual copying is deferred until the last possible time. If no write is performed, no copying occurs. For this reason, this method is called "copy-on-write" or "virtual copy."

Generally, a copy-on-write operation is computationally expensive because a single write results in two write operations. That is, an existing data block needs to be copied from an old physical block to a new physical block, and then the actual update/write operation is performed on the new physical block. In view of this computational overhead, there is a need in the art for a novel copy-on-write implementation which, in part, eliminates the dual write requirement.

DISCLOSURE OF INVENTION

The shortcomings of the prior art are overcome and additional advantages are provided, in one aspect, through a method of implementing a copy-on-write in a computing environment. This method includes employing a first mapping table to perform a first virtual block to physical block mapping for use in reading a block of data of a file from physical storage for modification; and employing a second mapping table to perform a second virtual block to physical block mapping for use in writing a modified block of the data of the file to physical storage, wherein copy-on-write of the block of data is achieved using a single write operation.

In another aspect, a method of facilitating a copy-on-write in a client server computing environment is provided. This method includes maintaining at a filesystem server of the client server computing environment a read mapping table and a write mapping table for a file, wherein the read mapping table is usable to perform a first virtual block to physical block mapping for use in reading a block of data of the file from a physical storage for modification, and the write mapping table is usable to perform a second virtual block to physical block mapping for use in writing a modified block of the data of the file to physical storage, wherein using the read mapping table and the write mapping table, copy-on-write of a block of data is achievable using a single write operation.

In still another aspect, a method of implementing a copy-on-write of a file within a client server environment having a plurality of clients is provided. This method includes performing a copy-on-write of a file using multiple clients of the client server environment. The performing includes performing, by a first client of the multiple clients, copy-on-write of at least one block of data of the file to be copy-on-written; and performing, by a second client of the multiple clients, copy-on-write of at least one other block of data of the file to be copy-on-written. In enhanced aspects, the performing includes performing, by the first client, copy-on-write of the at least one block of data of the file employing a single write operation, and performing, by the second client, copy-on-write of the at least one other block of data also employing a single write operation.

In a further aspect, a method of facilitating a copy-on-write of a file within a client server environment is presented. This method includes controlling, from a filesystem server, implementation of a copy-on-write for a file stored in a shared storage unit of the client server environment, the controlling includes allowing a first client of the client server environment to copy-on-write a portion of data in the file and allowing a second client of the client server environment to copy-on-write a different portion of the data in the file, wherein the filesystem server controls and facilitates performance of a distributed copy-on-write for the file.

Various additional features and enhancements to the above-summarized methods are also described and claimed herein, as are systems and computer program products corresponding to the above-summarized methods.

Further, additional features and advantages are realized through the techniques of the present invention. Other embodiments and aspects of the invention are described in detail herein and are considered a part of the claimed invention.

BRIEF DESCRIPTION OF DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 depicts one example of a file representation (200) to an application or process wherein ranges or offsets are translated to virtual/relative block numbers;

FIG. 3 is a representation of a filesystem mapping table (300) wherein the virtual/relative block numbers of FIG. 2 are mapped to physical block addresses in one or more storage units of the filesystem;

FIG. 4 is a representation of a disposition of the physical block addresses of FIG. 3 within a storage unit of the filesystem;

FIG. 5 depicts one example of a read of four bytes of data starting at offset 5000, and falling within physical block D of a storage unit of the filesystem;

FIG. 9 depicts one example of a read mapping table (900) and a write mapping table (910) for use in copy-on-writing a file, in accordance with an aspect of the present invention;

FIG. 10 is a flowchart of one embodiment of a block of data read process for use in a copy-on-write operation pursuant to the logic of FIG. 6, in accordance with an aspect of the present invention;

FIG. 11 is a flowchart of one embodiment of a block of modified data write process for a copy-on-write operation pursuant to the logic of FIG. 6, in accordance with an aspect of the present invention;

BEST MODE FOR CARRYING OUT THE INVENTION

Overview

Presented herein, in one aspect, is a technique for implementing copy-on-write in a computing environment. This technique includes employing different translations, i.e., a read mapping table and a write mapping table, to achieve copy-on-write of a unit of data in a file using a single write operation. As one example, copy-on-write is achieved by reading from physical storage a block of data of a file for modification using a first virtual block to physical block mapping, and then writing a modified block of that data to the physical storage using a second virtual block to physical block mapping, wherein the first virtual block to physical block mapping and the second virtual block to physical block mapping comprise different mappings.

In another aspect, presented herein is a technique for implementing a distributed copy-on-write of a file across multiple clients of a client server environment. Within such an environment, a first client of the multiple clients performs copy-on-write of at least one block of data of the file, and a second client of the multiple clients performs copy-on-write of at least one other block of data of the file. In one implementation, the clients can comprise heterogeneous operating systems, with each copy-on-write of a block of data within the file being copy-on-written being performed using a single write operation. Also, the copy-on-write can be achieved employing a first mapping translation (e.g., using a read mapping table) and a second mapping translation (e.g., using a write mapping table) as summarized above. These and other aspects of the present invention are described below and recited in the claims appended herewith.

DETAILED DESCRIPTION

Figure 1:
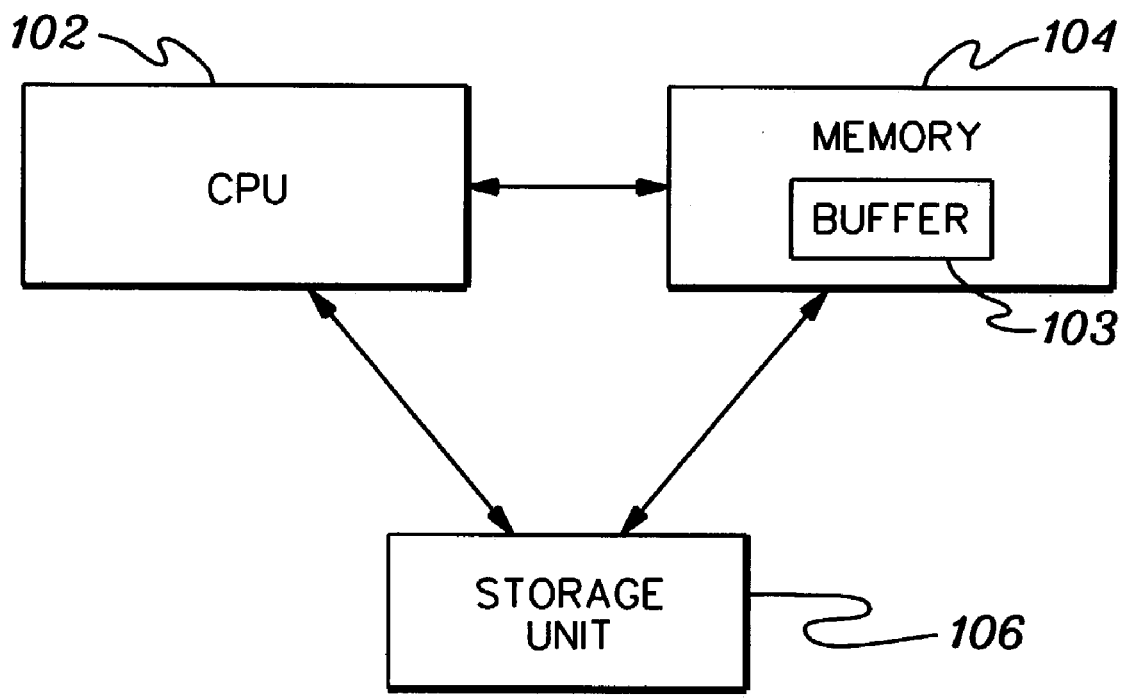
FIG. 1 depicts one embodiment of a computing environment to incorporate and use one or more aspects of the present invention.

One example of a computing environment, generally denoted 100, incorporating and using copy-on-write in accordance with an aspect of the present invention is depicted in FIG. 1. As shown, computing environment 100 includes, for instance, at least one central processing unit 102, a memory 104 and one or more storage units or devices 106.

As is known, central processing unit 102 is the controlling center of a computing unit and provides the sequencing and processing facilities for instruction execution, interruption action, timing functions, initial program loading and other machine related functions. The central processing unit executes at least one operating system, which as known, is used to control the operation of the computing unit by controlling the execution of other programs, controlling communication with peripheral devices and controlling use of the computer resources.

Central processing unit (CPU) 102 is coupled to memory 104, which is directly addressable and provides for high speed processing of data by the central processing unit. Memory 104 includes a buffer or cache region 103 which is employed by CPU 102 as described further herein. In another embodiment, buffer 103 could reside within CPU 102. Storage unit 106 is one example of an input/output device. As used herein, storage unit 106 could be external to a computing unit or within a computing unit of computing environment 100, and can include, for example, main memory, magnetic storage media (e.g., tape, disk) and direct access storage devices, etc. Data can be transferred from and to CPU 102, memory 104 and storage unit 106 as shown.

In one example, computing environment 100 is a single system environment, which includes an RS/6000 computer system running in AIX operation system (RS/6000 and AIX are offered by International Business Machines Corporation). The invention is not limited to such an environment, however. The capabilities of the present invention can be incorporated and used within many types of computer environments and many types of computer systems. For instance, computer environment 100 could comprise a distributed computing environment, and could include a UNIX workstation running a UNIX based operating system. Other variations are also possible and are considered a part of the claimed invention.

As is known, a file is a named object in a filesystem of a computing environment which can be used to store user/application data. This data can then be accessed by specifying a file name, an offset and a length. To the user applications or processes, data on the file appears to be continuous, but within a storage unit (such as a disk), the data representation can be different. Each filesystem maintains a mapping table which provides a mapping or translation between a virtual (relative) offset block number to a physical block number, wherein a block can be a page or other unit of data within the file, with the size of the unit being specified by the filesystem.

In the example of FIG. 1, the filesystem is assumed to comprise the storage unit, which again may be external or internal to a particular computing unit of the computing environment. FIG. 2 depicts one example of a file representation 200 which correlates application or process data ranges and offsets with virtual/relative block numbers for a given file. Note that each file has its own set of virtual/relative block numbers. In this example, file data from 0 to 4K bytes is mapped to virtual/relative block number 1, data from 4 to 8K bytes is mapped to block number 2, data from 8 to 12K bytes is mapped to block number 3, and data from 12 to 16 K bytes is mapped to block number 4. Again, these numbers are provided for example only.

FIG. 3 depicts one example of a filesystem mapping table 300 for a particular file. Table 300 is employed in translating the file's virtual/relative block numbers into actual physical block addresses of the storage unit. For example, virtual/relative block numbers 1, 2, 3 & 4 are shown mapped to physical block address A, D, G & L of a storage unit 400 (see FIG. 4).

By way of example, if an application or process wishes to read 4 bytes of data from a particular file starting at offset 5000, then using the file representation 200 and filesystem mapping table 300 of FIGS. 2 & 3, the actual data read is found to occur from physical block D as shown in FIG. 5. This is because the 4 bytes of data starting at offset 5000 fall within virtual/relative block number 2, which as noted in FIG. 3, translates into physical block address D of the storage unit.

As noted initially, a flash copy operation enables space efficient copies of storage to be made quickly. Since the operation needs to be fast, no physical copy is initially made as part of the operation. Later, any attempt to modify the applicable file data results in a copy-on-write operation. In a client server environment, a medadata copy-on-write is typically carried out by the filesystem server, while the file data copy-on-write is carried out by a client. PageIn and PageOut threads can be used to bring a block of data into a cache at the client, update the data and then write the data back to the storage unit. If different translations for the PageIn and PageOut are employed as described herein, then the client can read potential copy-on-write data into its buffer, apply any updates to the data in the buffer, and write the modified data to a new location in the storage unit through the PageOut thread. By having two mapping tables or translations, a copy-on-write technique is thus provided which, in one embodiment, takes advantage of existing PageIn and PageOut concepts.

Figure 6:
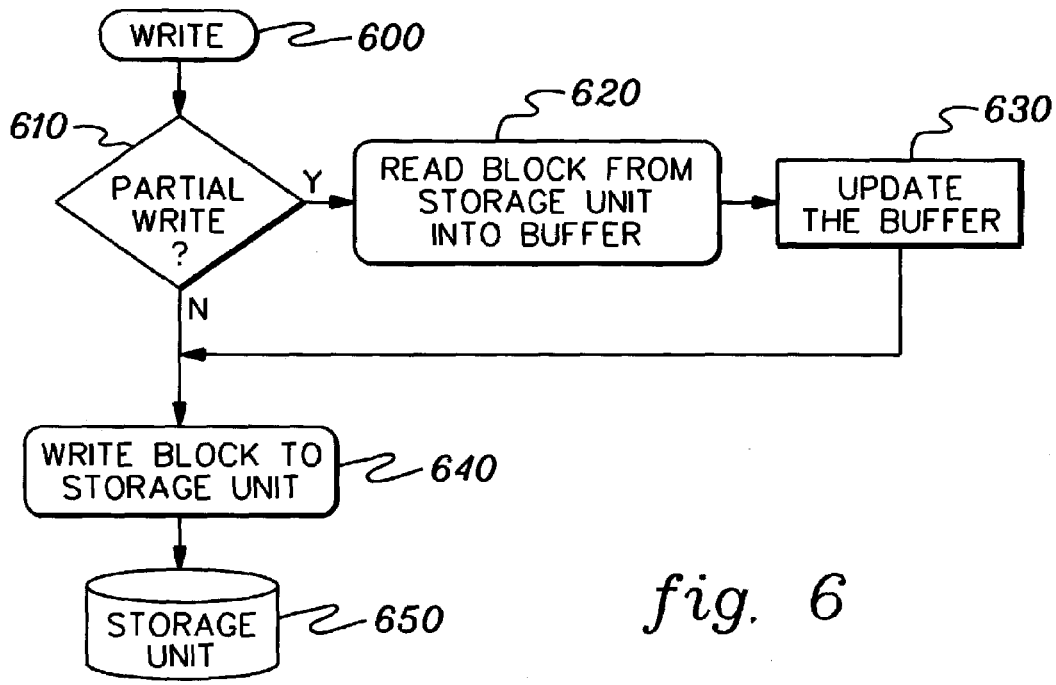
FIG. 6 is a flowchart of one embodiment of a write operation and a copy-on-write operation, in accordance with an aspect of the present invention.
Figure 7:
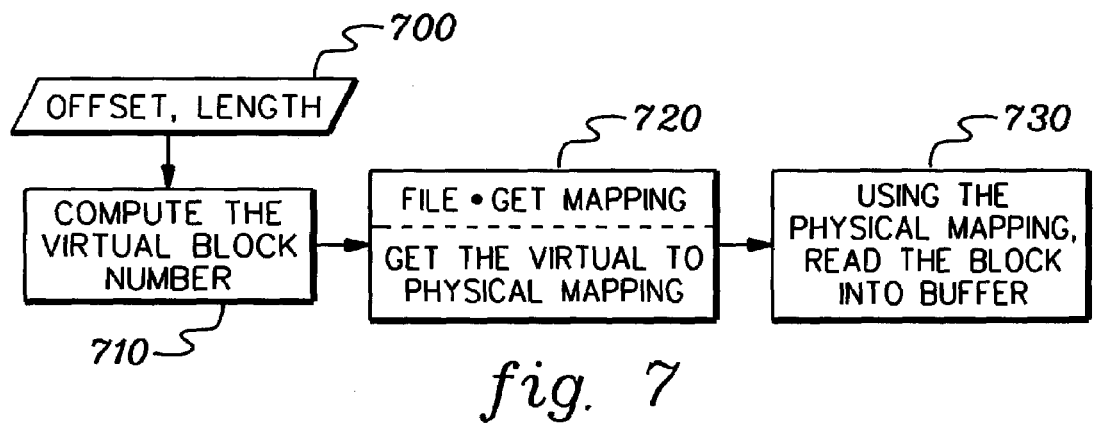
FIG. 7 is a flowchart of one example of a read process for reading a block of data from a storage unit into a local buffer or cache for use in a write operation pursuant to the logic of FIG. 6.
Figure 8:
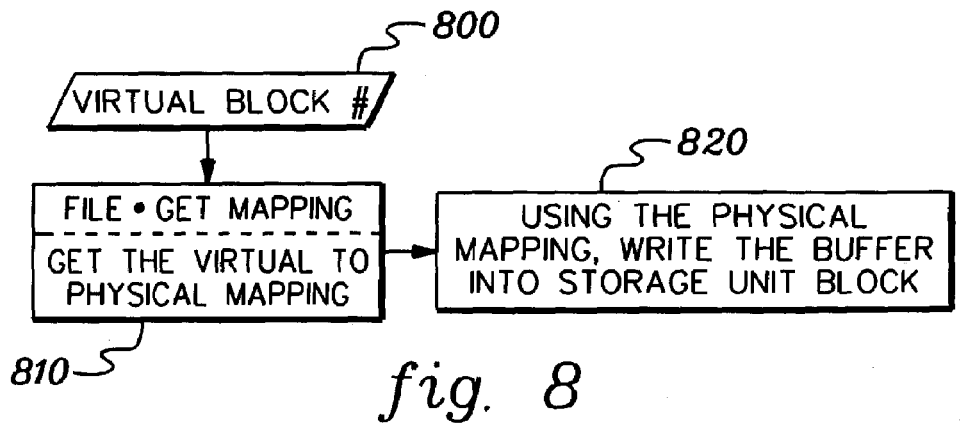
FIG. 8 is a flowchart of one example of a write process for writing a modified block of data to a storage unit for use in a write operation pursuant to the logic of FIG. 6.

FIG. 6 is a flowchart embodiment of one embodiment of a write operation, as well as a copy-on-write operation in accordance with an aspect of the present invention. A write operation 600 begins by determining whether a full block (or full page) of data of a file is to be written 610. If a partial block write of data, then the applicable block of data in the file is read from the storage unit into a local buffer 620 (PageIn). This is followed by an update of the block of data in the buffer 630, and then a writing of the modified block of data of the file to the storage unit 640. If a full block of data of a file is to be written, then the logic simply proceeds to write the full block of data to the storage unit, denoted 650 in FIG. 6. As is known, logic of FIG. 6 can be implemented within an operating system kernel. FIGS. 7 & 8 depict examples of further processes implementing a write operation using the logic of FIG. 6.

FIG. 7 depicts one embodiment of processing for reading a block of data of a file from a storage unit into a buffer. The application input is again an offset and length of file data to be read 700, which is used to compute a virtual block number 710 (for example, using a file representation such as depicted in FIG. 2). Processing then performs a subroutine call File-Get to map the virtual block number to a physical block address for the file data within the storage unit 720. Using the physical block address, the block of data is read from the storage unit into the local buffer 730.

FIG. 8 depicts one example of processing for writing a block of data of a file to a storage unit. As shown, the virtual block number 800 is used in a File Get mapping process to obtain the virtual to physical mapping 810, for example, using a filesystem mapping table such as depicted in FIG. 3. The physical block address is then used when writing the modified data block from the buffer into the storage unit 820. In one embodiment, the block read processing of FIG. 7 could comprise a PageIn thread process, while the data block write process of FIG. 8 could comprise a PageOut thread process.

Advantageously, disclosed herein is a technique for achieving a copy-on-write without any change in the high level write logic flow of FIG. 6. This technique employs two sets of translations or mapping tables, referred to as a read mapping table and a write mapping table for a particular file of data, for which a copy-on-write is to be performed. In one embodiment, these two mapping tables are maintained by the filesystem and accessed by a client application whenever a copy-on-write is to be performed. For example, these two mapping tables are presented simultaneously to the filesystem driver at the physical address translation boundary.

By way of example, FIG. 9 depicts a read mapping table 900 and a write mapping table 910. Read mapping table 900 maps virtual block numbers 1, 2, 3 & 4 to physical block numbers A, D, G & L, respectively, while write mapping table 910 maps virtual block numbers 1, 2, 3 & 4 to physical block numbers W, X, Y & Z, respectively. The read mapping table provides a first virtual to physical translation that is employed for a read operation, while the write mapping table provides a second virtual to physical translation which is employed for a write operation. More particularly, as one example, a copy-on-write can be implemented using the read table translations for PageIn and write table translations for PageOut.

FIG. 10 depicts one embodiment of a data block read process for use in a copy-on-write operation pursuant to the logic of FIG. 6. As shown, an application specifies a data offset and length within the file 1000, from which a virtual block number is computed 1010 (see FIG. 2). Processing then uses a read mapping table for the file (e.g., table 900 of FIG. 9) to obtain a virtual to physical read mapping 1020. This physical read mapping is then used to read at least one data block of the file from the storage unit into the local buffer 1030.

FIG. 11 depicts an example of a data block write process for use in a copy-on-write operation pursuant to the logic of FIG. 6. The virtual block number 1100 is used to obtain a virtual to physical "write" mapping 1110 using the write mapping table (e.g., table 910 of FIG. 9) for the file. Using the physical write mapping, the modified data block is written from the local buffer into the corresponding storage unit physical block 1120. As noted above, if a copy-on-write of a full block of data of a file is to be performed, then the modified data block is simply written directly to storage using the physical "write" mapping of FIG. 11. In such a case, only the write mapping table for the file is employed.

Those skilled in the art will note that a regular write operation can still be performed using the logic of FIGS. 6, 10 & 111 by making the read mapping table and write mapping table identical so that the read, update and write occur at the same physical block address within the storage unit. Advantageously, however, this logic is also the same for a copy-on-write. When a copy-on-write is requested for a file, the filesystem allocates, for example, new physical address blocks and updates the corresponding write mapping table for the file. By doing so, the write operation occurs at a different physical block address then the read operation, meaning that the original data remains untouched in the storage unit. After the write operation, the read mapping table for the file can be updated depending upon the particular copy-on-write application.

Figure 12:
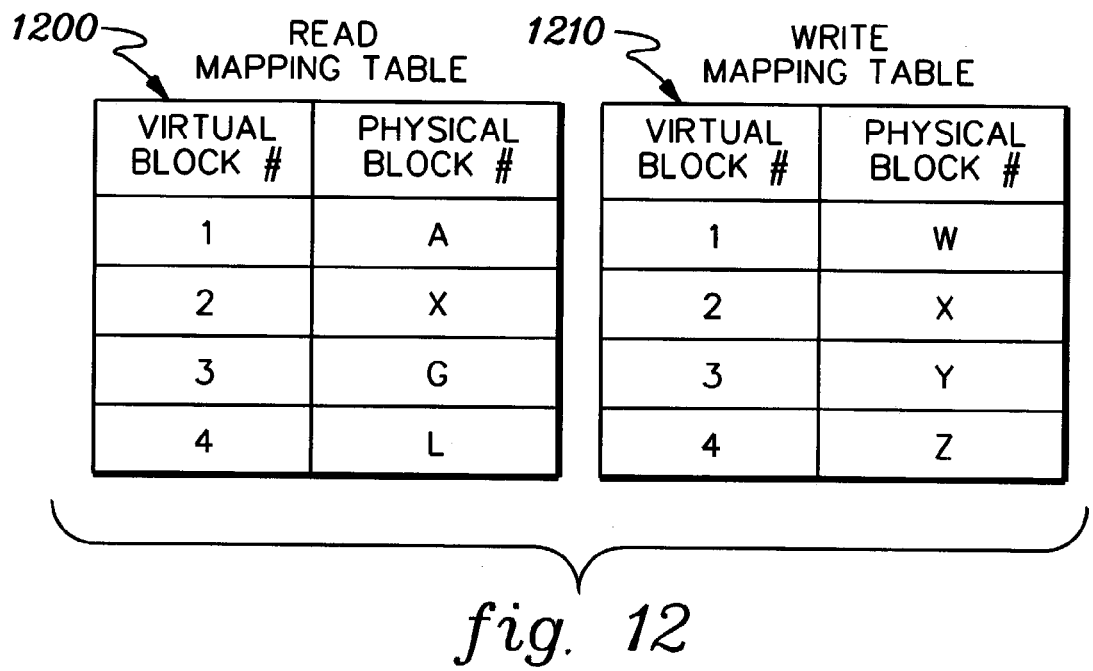
FIG. 12 is a further example of a read mapping table (1200) and a write mapping table (1210) for use in copy-on-writing a file, in accordance with an aspect of the present invention.

Referencing the mapping tables of FIG. 9, and using the example of FIG. 5, if a copy-on-write change is to be made to the 4 bytes of data of a file at offset 5000, (for example, changing data content "first second" to "second first"), then the updated block of data is written to physical block number X in the storage unit (which using the write mapping table 910 (FIG. 9) corresponds to virtual block number 2). After the copy-on-write operation, the corresponding read mapping table (900 of FIG. 9) can be updated such that virtual block number 2 translates into physical block number X within the storage unit, which is shown in the updated read mapping table 1200 of FIG. 12. The write mapping table 1210 of FIG. 12 is identical to the write mapping table 910 of FIG. 9. However, after the copy-on-write, whether and how the physical block number in the read mapping table is updated depends upon the application using the copy-on-write. For example, for a "data preserve" type of application, the physical block numbers in the read mapping table could be maintained to preserve the initial file references. For a "data movement" type of application, wherein file data is to be physically moved from one portion of a storage unit to another portion, the original physical block number could be freed upon updating the read mapping table with the new physical block address number from the write mapping table.

Figure 13:
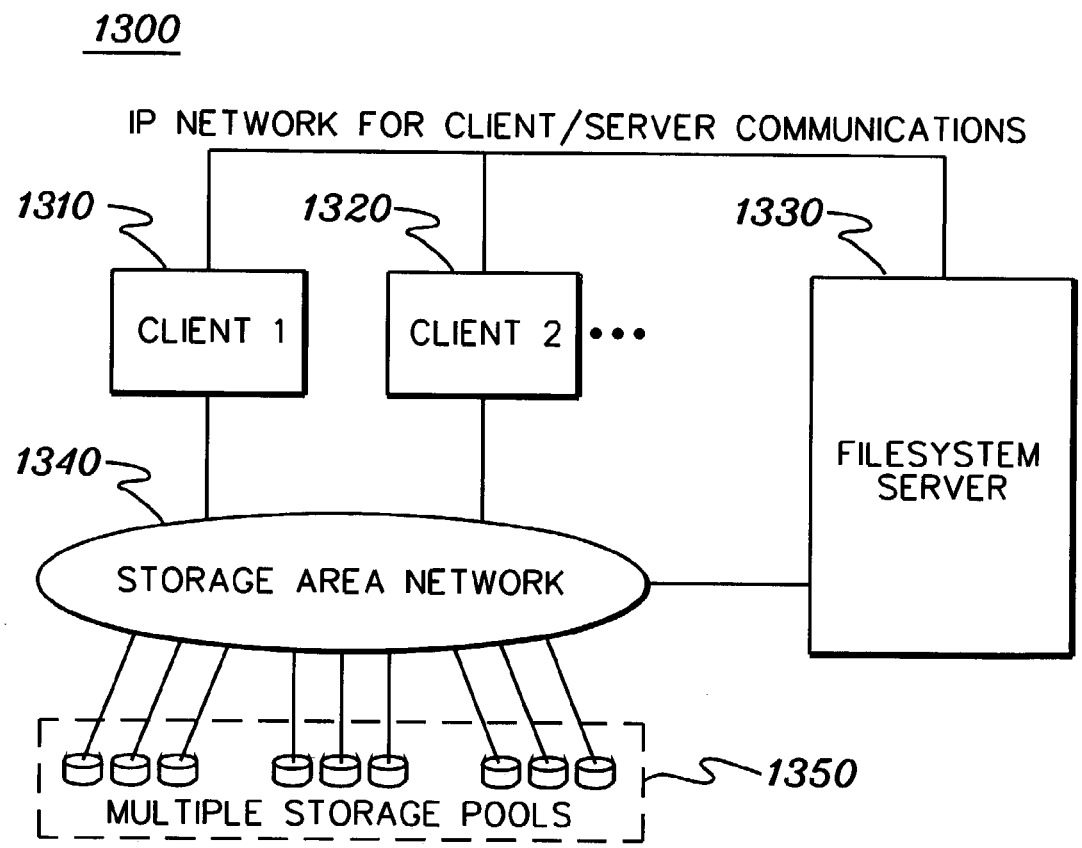
FIG. 13 depicts another embodiment of a computing environment to incorporate and use one or more aspects of the present invention.

FIG. 13 presents another embodiment of a computing environment, generally denoted 1300, which can incorporate and use one or more aspects of the present invention. Environment 1300 includes a plurality of clients, including client 1 1320 and client 2 1320, which are connected in this example by an Internet Protocol network for client/server communications to a filesystem server 1330. Server 1330 connects to a Storage Area Network 1340, which has multiple storage pools 1350 available for storage of file data. Client 1 1310 and client 2 1320 also directly connect to Storage Area Network 1340.

As one example, computing environment 1300 is assumed to have certain features, including: the maintenance of mapping files such as described herein (e.g., read mapping table and write mapping table for a file) at one location (e.g., the filesystem server); the client applications have direct access to the storage unit (i.e., multiple storage pools) through the Storage Area Network (SAN); and the client applications have access to read/write any object of a file in the multiple storage pools. Such a SAN environment is discussed in detail in various publications, including a thesis by Randal Chilton Burns entitled "Data Management In A Distributed File System For Storage Area Networks", University of California, Santa Cruz, (March 2000).

Figure 14:
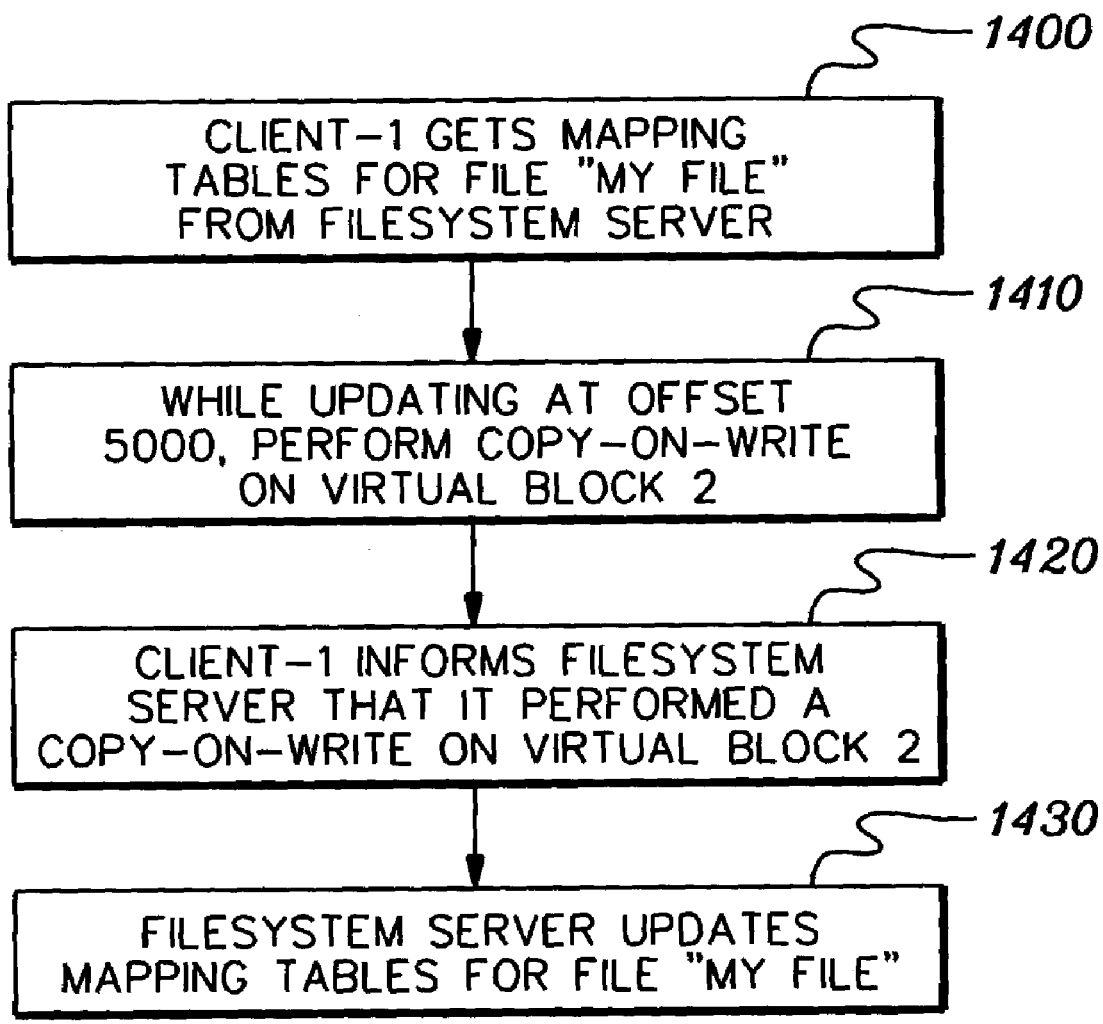
FIG. 14 is a flowchart of one embodiment of a client-1, for example, of the client server environment of FIG. 13, performing copy-on-write of at least one block of data of a file, in accordance with an aspect of the present invention.
Figures 15, 16:
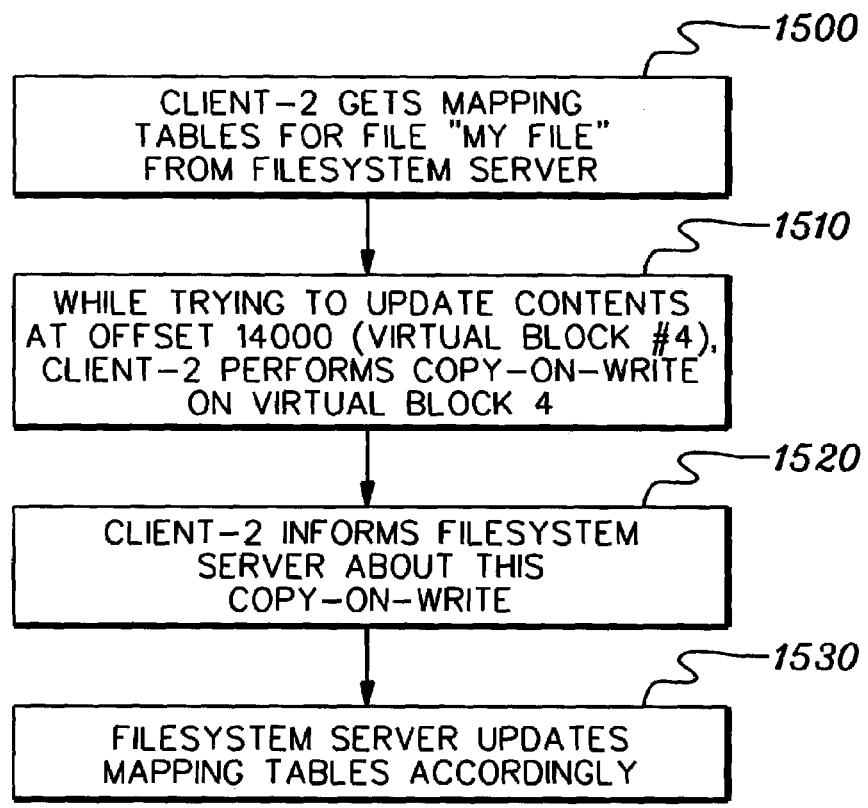
FIG. 15 is a flowchart of one embodiment of a client-2, for example, of the client server environment of FIG. 13, performing copy-on-write of at least one other block of data of the file, in accordance with an aspect of the present invention.
FIG. 16 depicts another example of a read mapping table (1600) and write mapping table (1610) for a file employed during a copy-on-write, in accordance with an aspect of the present invention.

In another aspect of the present invention, a distributed copy-on-write function is presented wherein different client applications update different portions of a file. For example, client 1 performs copy-on-write of virtual block 2 of a file, while client 2 performs copy-on-write of virtual block 4 of the file. FIGS. 14 & 15 depict this example in greater detail.

FIG. 14 depicts one example of client 1 performing copy-on-write of virtual block 2. Client 1 initially obtains the mapping tables for a file, labeled "my file", from the filesystem server 1400. While updating at, for example, offset 5000, copy-on-write is performed on virtual block 2 1410. Client 1 informs the filesystem server that it performed a copy-on-write of virtual block 2 1420, and the filesystem server updates its mapping tables accordingly 1430. In one example, the copy-on-write can be performed as described above in connection with FIGS. 6 & 9–12.

Client 1 performs the copy-on-write update of virtual block 2 of the file data using a lock mechanism. The locking mechanism comprises a lock per filesystem object, which a client needs to acquire from the filesystem server in order to perform an operation on a given file. Therefore, in one embodiment, when client 1 receives this lock, it also receives the mapping tables for the file, and when client 1 loses the lock, all mapping tables at client 1 for the file become invalid. Hence, the next time client 1 obtains the lock, client 1 cannot use any existing mapping tables, but instead obtains the current mapping tables from the filesystem server.

By way of further explanation, the computing environment of FIG. 13 could employ a distributed locking mechanism to control access to the filesystem objects from the different clients. There are two types of distributed locks, namely, a session lock and a data lock. These locks are per filesystem objects. A session lock is equivalent to an open "file descriptor". When this lock is acquired by a client, it tells the server that this client is interested in using this file. The client can acquire a session lock in different modes, for example, a read mode, write mode, exclusive mode, etc. For example, when client A is holding session lock in exclusive mode, and another client, say client B wishes to open the same file, it sends a request to the server for a session lock, the server rejects that lock request because client A has an exclusive mode, hence client B cannot operate on the file. The second type of distributed lock is a data lock. A data lock is used for doing physical read/writes. A client should have a data lock in read/write mode to do a read/write on the file. By way of further explanation, a session lock can be held by two clients in write mode at the same time. This means that both clients have permission to write to a particular file, but those clients cannot write until they obtain a data lock in a write mode. But at a given point in time, only one client can get the data lock in the "write mode" so that only one client can perform the real I/O. If both clients are actively working on a file, they will be holding write mode session locks while data lock will be shuttling between both clients for completing their writes.

At some point in time, client 2 requests a lock in order to perform a copy-on-write of another portion of the file "my file". As shown in FIG. 15, client 2 obtains the mapping tables from the filesystem server for the file "my file" 1500. While updating the file contents at offset 14000 (i.e., virtual block number 4), client 2 performs a copy-on-write on virtual block number 4 of the file 1510. Client 2 thereafter informs the filesystem server about this copy-on-write update and the server updates the read mapping tables for "my file" accordingly 1530. FIG. 16 shows an updated read mapping table 1600 and the write mapping table 1610 resulting from the copy-on-write updates of FIGS. 14 & 15 for "my file" (having starting from the mapping tables of FIG. 9). As shown, the read mapping table now has virtual block number 2 mapped to physical block number X, and virtual block number 4 mapped to physical block number Z.

To summarize, implementation of copy-on-write within an environment such as depicted in FIG. 13 could be distributed across multiple client applications. Thus, a plurality of client applications can be involved in performing a copy-on-write of a file in the distributed filesystem. A distributed lock mechanism such as described above can be used, which would be owned by only one client application at a time. For example, when client 1 has the distributed lock, then client 1 will have the valid read mapping table and write mapping table for the copy-on-write operation. If client 2 wishes to do a copy-on-write of another portion of the same file, then the filesystem server takes the distributed lock from client 1 and gives it to client 2. In an alternative example, the distributed lock could be divided by file ranges, so that both client 1 and client 2 could simultaneously perform copy-on-write on different portions of the file.

Figure 17:
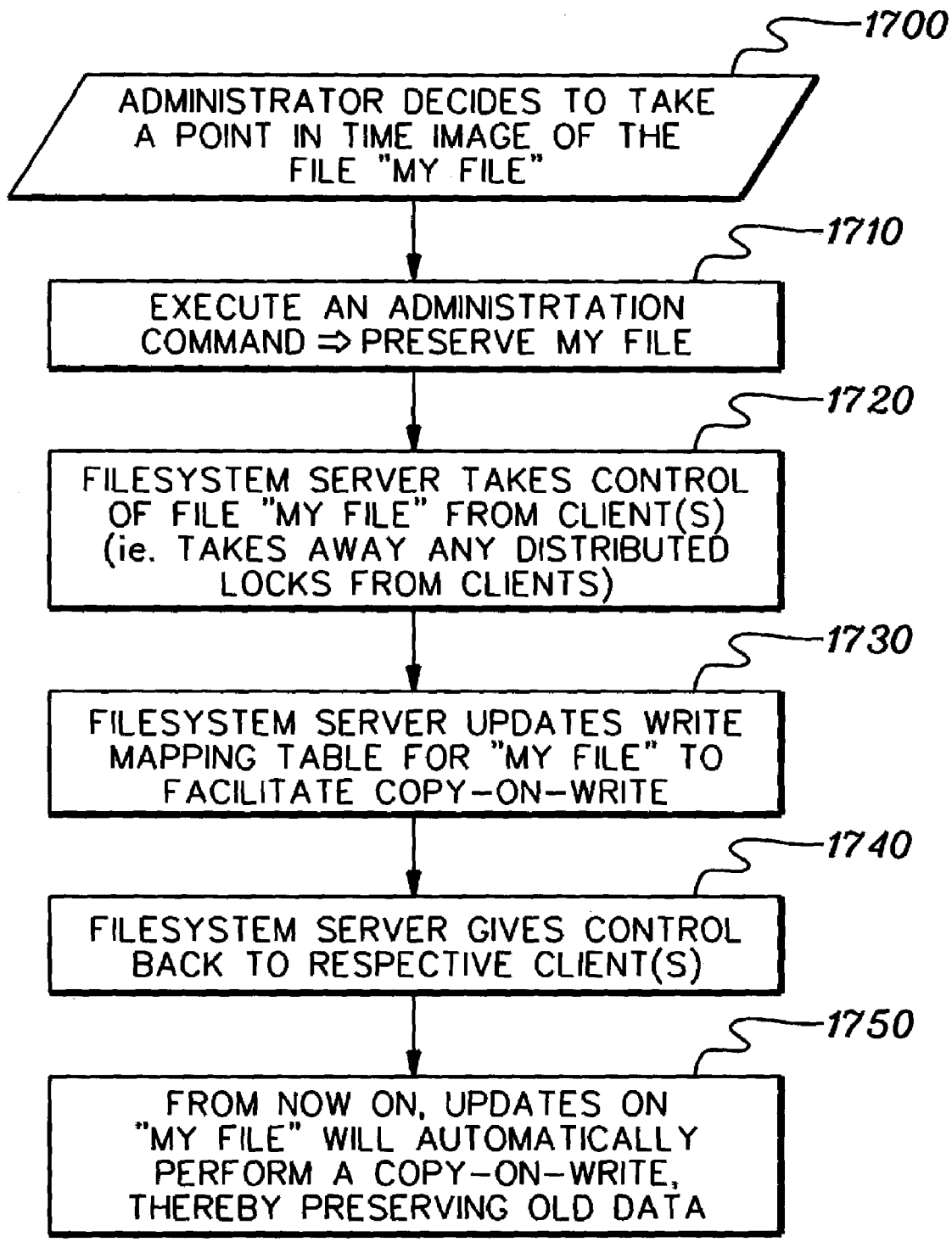
FIG. 17 is a flowchart of one example of a data preserve application employing copy-on-write in accordance with an aspect of the present invention.

FIG. 17 depicts one example of a "data preserve" application for a copy-on-write in a distributed client server environment. Initially, an administrator decides to take a point-in-time image of the file "my file" 1700. An administration command is executed to preserve "my file" 1710, which is followed by the filesystem server taking control of the file "my file" from the client application(s) 1720. For example, the filesystem server takes away any distributed locks for the file from the client applications. (This step would not be applicable in a non-distributed, non-client/server environment.) Next, the filesystem server updates the write mapping table to facilitate the copy-on-write 1730, and the server returns control back to the respective client application(s) 1740. From this point forward, any update on "my file" by a client application automatically results in the copy-on-write being performed for that particular portion of the file, while still preserving the old data path (i.e., the physical block numbers in the read mapping table could be maintained to preserve the initial file references).

Specific Examples

One detailed implementation of various aspects of the present invention is next presented. In this detailed explanation, there are two types of input/output (I/O) operations possible, i.e., buffer I/O and direct I/O.

Buffered I/O

Buffered I/O means I/O performed through a buffer cache. In this case, reads/writes first go to the cache, and later this cached data is hardened to a storage unit (e.g., disk).

Update on an existing file is done by reading data into the cache. Applying all changes into the cached/buffered pages and then writing the data back to disk. Taking this fact into consideration, copy-on-write as disclosed herein is achieved without any added cost. By way of example, a client that is to access a distributed filesystem may comprise at least two components; i.e., (i) an Installable File System (IFS), which is operating system specific, and handles requests from applications, and communicates with the buffer memory system and storage devices such as disks, and (ii) the Client State Manager (CSCM), which is common to all operating systems, and handles lock management and communication with the server. From a flash copy perspective, an IFS contacts a CSM for the following operations.

Read—uses CSM API, csmTranslateBlocks( ) to get virtual to physical translations.

Write—happens in two steps:
1. IFS needs to make sure that it has backing blocks before accepting any writes into the page cache. So it calls CSM through its API, csmAttachBlocks( ).
2. Upon success of csmAttachBlocks, IFS allows the write to go through.
   DirectIO: In this case, the write directly goes to disk.
   BufferedIO: Here IFS need to get the page into cache, modify it and then write to disk Truncate—uses CSM API, csmDetachBlocks( ) to shrink the file.

IFS employs the following three interfaces to do file block related manipulations.
1. csmAttachBlocks( ): When IFS's intent is to write( ), this interface will be used. If CSM can't satisfy this request through its cache, it sends transaction of type stpMsgType_BlkDiskAllocate to server.
2. csmTranslateBlocks( ): This interface can be used either for read( ) or write( ). IFS can use this interface, during read and while hardening the cache (part of write operation). If CSM can't satisfy this request through its cache, it sends transaction of type stpMsgType_BlkDiskGetSegment to server.
3. csmDetachBlocks( ): This is used for truncate( ).

In accordance with an aspect of the present invention, two types of virtual to physical mappings are maintained in CSM.
1. Read translations: This tells what is the virtual to physical mapping for a read.
2. Write translations: This tells what is the virtual to physical mapping for a write.

In one embodiment, a segment may have read and write translation lists in the following three states.

Valid Read translations but Invalid Write translations.
Valid Write translations but Invalid Read translations.
Both read and write translations are valid.

Read

For a read system call, IFS calls csmTranslateBlocks( ) with read flag set to indicate that it needs read translations.

For "Read" translations, CSM looks at write translations first. If it exists and is in use, it returns write block translations.

If not, then CSM looks at read translations. If they are available and are in use, then they will be returned.

If not, CSM returns zero's indicating that these blocks needs to be zero filled.

Write

For a write system call IFS calls csmAttachBlocks( ). On success, it guarantees that the backing blocks are allocated.

If it is an update, IFS needs to bring the block into the cache. So the PageIn thread calls csmTranslateBlocks( ) with read flag. From the above 'read' logic, IFS gets block translations. (For writes into new blocks, this step will be skipped).

Now IFS updates the in-cache page and once it is ready to flush that page to disk, it again calls csmTranslateBlocks( ) with write flag. Now CSM needs to give just write translations.

IFS uses the translations given in previous step and flushes the cache (writes to disk).

Truncate

IFS calls csmDetachBlocks( ) for file shrink.

CSM needs to mark both the read and the write translations of the corresponding virtual block(s) to invalid state.

The above operations will be done at CSM's cache. At regular intervals, or on specific conditions, CSM can update the server with modifications through blkdisk update. Also, the above discussion mostly assumes that the write is a "cached/buffered IO". Things change somewhat for "directI/O" writes.

Direct I/O

Since the Direct I/Os do not always happen on block boundaries, we may need to mimic cache I/O for un-aligned portions of the write( ).

In response to either stpMsgType_BlkDiskAllocate or stpMsgType_BlkDiskGetSegment, CSM gets a list of extents for each segment requested. These segment translations are unmarshalled and stored in CSM's cache.

The server may not send the read translations if they are exactly same as the write translations. This could be an optimization.

Each segment is represented by the data structure named mcBlkDiskSegment.

Elements of this in-cache segment structure might include:

| | |
|---|---|
| s_objP | Pointer to the file object to which this segment belongs. |
| s_segNo | Segment number within the file. |
| s_readExtentCount | Current number of read extents in this segment. |
| s_readExtentList | List of contiguous block segments that represent "read" translations of this segment. |
| s_inlineReadExtent | Inline representation of above list. |
| s_readBlockUsedState | This is a bit map. One bit for each block in the segment. It indicates if the block is in used/un-used state. 1 - Used, 0 un-used. |
| s_writeExtentCount | Current number of write extents in this segment. |
| s_writeExtentList | List of contiguous block segments that represent "write" translations of this segment. |
| s_writeBlockUsedState | This is a bit map. One bit for each block in the segment. It indicates if the block is in used/un-used state. 1 - Used, 0 un-used. |
| s_isDirty | True if the live block state bit vector contains updates that must be synchronized with the server. |
| s_extentListValid | True if extent list is valid and is in cache; |

A client changes only s_readBlockUsedState and s_writeBlockUsedState under exclusive data lock. The remaining parts of segment translations stay unchanged at the client. So, while sending an update, the client sends only these two bit maps to the server.

Read operation does not change any bit map, i.e., it uses either s_readBlockUsedState or s_writeBlockUsedState to provide read translations, but it doesn't change it.

The write operation operates only on s_writeBlockUsedState, and does not use s_readBlockUsedState. Unlike the read operation, it may change (only sets) the bitmap of s_writeBlockUsedState to indicate a successful write operation.

A truncate operation may change both bit maps.

So in short, a read operation changes nothing, a write operation may set a few bits in s_writeBlockUsedState bitmap vector, and a truncate operation may unset bits in both bitmap vectors.

To summarize, in the case of cached I/O, a copy-on-write (COW) can be achieved at almost no cost. This is because there are typically two different threads/operations involved in completing a write operation, namely:

1. A PageIn thread/operation which brings the target data to be updated/changed into the cache; and
2. A PageOut thread/operation which flushes back the updated page to the disk.

Given this, a COW can be performed by using read translations for PageIn and write translations for PageOut.

Consider as an example:

Upon new file creation, CSM gets

Write block extent(s)

NULL read block extent(s)

Since this is new file, there is nothing to page in, so write data goes into the blank pages of cache.

As the write proceeds, IFS sets (through CSM interface) the corresponding bits in s_writeBlockUsedState bit vector, indicating that they are in-use.

As explained above, now future reads and writes in this block range get translations from write extents.

Assume that an administrator takes a flash copy:

As a part of the flash copy operation, the server revokes all data locks from a client. Hence, modified data will be synchronized to disk and metadata will be sent to the server through the update transaction. Since client doesn't have a data lock, any of its translations become invalid.

After a Flash Copy

For a read, client calls csmTranslateBlocks( ), and the server may send all "read" translations but "write" translations will be NULL.

For a write, client calls csmAttachBlocks( ). Now server returns read translations (same as above), and for the write extent list, the server should allocate a new set of unused blocks and return them. Thus, client has two translations. The client uses read translations as part of "page-in" and write translations as part of "page-out".

So we PageIn data blocks which were part of flash copy in the buffer cache, then apply updates. While paging out, we use the write translations, which point the PageOut thread to the new physical blocks.

A COW for directIO is little different. For Direct IO:
IFS calls csmTranslateBlocks( ) with write flag set, to see if it has backing blocks to proceed with write. After analyzing the translations from CSM, if backing blocks are not allocated, IFS calls csmAttachBlocks( ).
For a csmAttachBlocks( ), IFS needs to switch its data-lock from SHARED_WRITE Mode to EXCLUSIVE.
After the write is finished, client marks these blocks to the USED state. At this time, the client needs to hold a data lock in exclusive mode.
If the Direct IO boundary is not aligned with the block size, I/O to the first and last blocks is done in a cached fashion. Steps to do that include:
Call CSM for "Read Translations"
Allocate local kernel buffer.
Read-in Disk block into the newly allocated kernel buffer.
Update the kernel buffer.
Call CSM for write translations.
Write to the new block location (Write translations)
Call CSM to mark the new write block's "USED" bit.
For the middle blocks,
Make boundaries aligned to block size.
Call CSM to get write translations.
Write to the disk.
Call CSM to mark the block's "USED" bit.
The following is an example of the bit metrics on a client:
WriteBlockUsedState Bit array: Wbit
ReadBlockUsedState Bit array: Rbit
In Brackates (@<>) indicates the Physical block Address. That is, (@ A) means physical bock address is A.

Client sends only WriteBlockUsedState Bit array and ReadBlockUsedState Bit array to the server in a client server environment.
CSM interprets these bits and mappings as follows:

X = No Mapping for this block
M = Mapping Exists for this block

| State | Write Mapping | Write Bit | Read Mapping | Read Bit |
|---|---|---|---|---|
| Unallocated | X | 0 | X | 0 |
| Undefined | X | 0 | X | 1 |
| Undefined | X | 0 | M | 0 |
| Readable, Shared (COW Block Allocation Required) | X | 0 | M | 1 |
| Undefined | X | 1 | X | 0 |
| Undefined | X | 1 | X | 1 |
| Undefined | X | 1 | M | 0 |
| Undefined | X | 1 | M | 1 |
| Writable, but not Readable | M | 0 | X | 0 |
| Undefined | M | 0 | X | 1 |
| Undefined | M | 0 | M | 0 |
| COW Pending, Reads Uses RM, Writes uses WM | M | 0 | M | 1 |
| Writeable and Readable via Write mapping | M | 1 | X | 0 |
| Undefined | M | 1 | X | 1 |
| Undefined | M | 1 | M | 0 |
| Undefined | M | 1 | M | 1 |

To determine the mapping of a block CSM first looks at the write mapping, and if one is present and the corresponding W bit is set, then CSM uses that mapping for both the read and write operations.

UD—Un-Defined.

| Opera. | Vir Blk # 1 | | Vir Blk #2 | | Vir Blk #3 | | Vir Blk #4 | |
|---|---|---|---|---|---|---|---|---|
| | (W Phy Blk @) Wbit | (R Phy Blk @) Rbit | (W Phy Blk @) Wbit | (R Phy Blk @) Rbit | (W Phy Blk @) Wbit | (R Phy Blk @) Rbit | (W Phy Blk @) Wbit | (R Phy Blk @) Rbit |
| File Creation & Alloc | (@ A) 0 | UD UD | (@ B) 0 | UD UD | (@ C) 0 | UD UD | (@ D) 0 | UD UD |
| Write 3 blocks | (@ A) 1 | UD UD | (@ B) 1 | UD UD | (@ C) 1 | UD UD | (@ D) 0 | UD UD |
| Read the file(No change frome above) | (@ A) 1 | UD UD | (@ B) 1 | UD UD | (@ C) 1 | UD UD | (@ D) 0 | UD UD |
| Truncate to 2 blocks. | (@ A) 1 | UD UD | (@ B) 1 | UD UD | (@ C) 0 | UD UD | (@ D) 0 | UD UD |
| PIT Read | → NULL UD | → (@ A) 1 | → NULL UD | → (@ B) 1 | → UD UD | → NULL UD | → UD UD | → NULL UD |
| Want to Update 1st 2 blks | (@ X) 0 | (@ A) 1 | (@ Y) 0 | (@ B) 1 | UD UD | NULL UD | UD UD | NULL UD |
| Write (update) 1st 2 blks. | (@ X) 1 | (@ A) 1 | (@ Y) 1 | (@ B) 1 | UD UD | NULL UD | UD UD | NULL UD |
| Truncate to 1 blk | (@ X) 1 | (@ A) 1 | (@ Y) 0 | (@ B) 0 | UD UD | NULL YD | UD UD | NULL UD |

If the write mapping is present, but the W bit is zero, then CSM looks for a read mapping.

If the read mapping is not present, then the block is considered unused (uninitialized) and the block can only be used for write operations. All read operations zero-fill the buffer.

If the read mapping is present then the block is considered in-use (initialized) and CSM assumes that the R bit is one (which it should be). A block in this state is considered COW pending only and would require a COW to modify its contents.

If the write mapping is not present, then CSM looks for a read mapping. If the read mapping is present, then CSM assumes the R bit is one (which it should be) and the block is considered in-use (initialized) for read operations but not for write operations. Before a write operation can be performed, CSM must request that a new backing block be allocated by the server.

CSM returns the bit vectors to the server to indicate changes in status of blocks as they are used, truncated and/or copy-on-written. On the return trip the server interprets the bits as follows.

X = Don't Care

| State | W | R |
| --- | --- | --- |
| Block is live (harden a COW or allocated block in use) | 1 | X |
| Truncate this block (mark as not in use if in use - freeable) | 0 | 0 |
| No Change to this block (may cancel COW pending) | 0 | 1 |

If the write bit is set:
server ignores the read bit.
If the block was in the Allocated state (i.e., traditional allocated but not live yet), then it gets changed to the Live state (i.e., the block is writable and readable).
If the block was in the COW_Pending state (i.e., the block has both a read and write mapping and they differ for purposes of COW), then the block goes to the Live state (i.e., the block is writable and readable through what was the write mapping).
If the write bit is not set, and the read bit is set:
This signifies to the server that there is no change for the block in question.
If the block was in the Allocated, COW_Pending, or PIT_COW_Pending state, then the block may remain in this state or may be freed asynchronously. The client cannot make the assumption that the block is freed or whether it remains in one of the COW_Pending states.
If the write bit is not set, and the read bit is not set:
This signifies to the server that the block has been truncated (provided it was previously allocated).
If the block was in the Unallocated state, then the block remains in the Unallocated state.
If the block was in the Allocated state, then the block remains in the Allocated state.
If the block was in the Live state, then the block goes to the Allocated state.
If the block was in the Shared state, then the block goes to the Unallocated state and the read (-only) mapping gets discarded.
If the block was in the COW_Pending state, then the block goes to the Allocated state.
If the block was in the PIT_COW_Pending state, then the block goes to the Allocated state.

Advantages

Advantageously, a technique is presented herein for implementing copy-on-write in a computing environment with minimal added costs to conventional data file write processing by minimizing redundant input/output. The copy-on-write technique presented is transparent to upper layers, such as standard filesystem drivers. The technique includes employing two different simultaneous translations, that is, a read mapping table and a write mapping table, to achieve copy-on-write of a unit of data in a file using a single write operation. In another aspect, presented is a technique for implementing a distributed copy-on-write of a file across multiple clients of a client server environment. Advantageously, the distributed copy-on-write implementation reduces the load on the centralized server, scales with the addition of clients, and allows copy-on-writing of a file to proceed notwithstanding that one or more of the clients may become inoperable. Further, the distributed copy-on-write presented allows parallel copy-on-writes, and allows a work load to be distributed among multiple clients, thereby providing a more efficient utilization of resources.

ALTERNATE EMBODIMENTS

Although examples of computing environments have been provided, these are only examples. Other embodiments may be used. For instance, although an example is described herein with reference to a filesystem, this is only one example. One or more other aspects of the present invention are applicable to other environments.

The present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of implementing a copy-on-write in a computing environment, comprising:
   (i) employing a first mapping table to perform a first virtual block to physical block mapping for use in reading a block of data of a file from physical storage for modification; and
   (ii) employing a second mapping table to perform a second virtual block to physical block mapping for use in writing a modified block of the data of the file to physical storage, wherein copy-on-write of the block of data is achieved using a single write operation.

2. The method of claim 1, wherein said first mapping table comprises a read mapping table and said second mapping table comprises a write mapping table, and wherein said write mapping table contains at least one virtual block mapped to a different physical block of the physical storage than the corresponding virtual block to physical block mapping of the read mapping table.

3. The method of claim 1, wherein the copy-on-write implementation further comprises initially determining whether a modification comprises a partial block write or a full block write, and if a partial block write, then performing said employing of the first mapping table and said employing of the second mapping table, otherwise performing said employing of the second mapping table without performing said employing of the first mapping table.

4. The method of claim 1, wherein said employing of the first mapping table comprises reading the block of data from physical storage into a buffer, and wherein said method further comprises modifying the block of data in the buffer before performing said employing of the second mapping table.

5. The method of claim 1, wherein the computing environment comprises a client server environment including a filesystem server and at least one client, and wherein said employing of the first mapping table and said employing of the second mapping table are performed by the at least one client of the client server environment.

6. The method of claim 5, wherein said employing of the first mapping table and said employing of the second mapping table performed by the at least one client further comprise making at least one call to the filesystem server to obtain at least one of the first mapping table and the second mapping table when performing copy-on-write of the block of data of the file.

7. The method of claim 5, further comprising updating the first mapping table after writing the modified block of data to physical storage, said updating including modifying at least one virtual block to physical block translation of the first mapping table to agree with a corresponding virtual block to physical block translation of the second mapping table.

8. The method of claim 1, wherein the computing environment comprises a computing unit and an external storage unit, the external storage unit comprising the physical storage, and wherein the employing of the first mapping table and the employing of the second mapping table are performed by the computing unit.

9. A method of facilitating a copy-on-write in a client server computing environment, comprising:
    maintaining at a filesystem server of the client server computing environment a read mapping table and a write mapping table for a file; and
    wherein the read mapping table is usable to perform a first virtual block to physical block mapping for use in reading a block of data of the file from physical storage for modification, and the write mapping table is usable to perform a second virtual block to physical block mapping for use in writing a modified block of the data of the file to physical storage, wherein using the read mapping table and the write mapping table, copy-on-write of a block of data is achievable using a single write operation.

10. The method of claim 9, wherein the write mapping table for the file contains at least one virtual block mapped to a different physical block of the physical storage than the corresponding virtual block to physical block translation of the read mapping table.

11. The method of claim 9, further comprising updating the read mapping table after a copy-on-write of a block of data of the file is performed, said updating including modifying at least one virtual block to physical block translation of the read mapping table to agree with a corresponding virtual block to physical block translation of the write mapping table.

12. A method of implementing a copy-on-write of a file within a client server environment having a plurality of clients, said method comprising:
    performing a copy-on-write of a file using multiple clients of the client server environment, said performing comprising:
        (i) performing, by a first client of the multiple clients, copy-on-write of at least one block of data of the file; and
        (ii) performing, by a second client of the multiple clients, copy-on-write of at least one other block of data of the file.

13. The method of claim 12, wherein said performing by the first client comprises performing, by the first client, copy-on-write of the at least one block of data of the file using a single write operation, and wherein said performing by the second client comprises performing, by the second client, copy-on-write of the at least one other block of data using a single write operation.

14. The method of claim 13, wherein a filesystem server of the client server environment is associated with at least one shared storage device containing the file, and wherein the filesystem server maintains mapping tables for the file stored in the at least one shared storage device, and said performing by the first client comprises obtaining, by the first client, a read mapping table and a write mapping table for the file from the filesystem server, and employing said read mapping table and said write mapping table in performing said copy-on-write of the at least one block of data of the file, and wherein said performing by the second client comprises obtaining, by the second client, the read mapping table and the write mapping table for the file from the filesystem server and employing the read mapping table and the write mapping table in performing said copy-on-write of the at least one other block of data of the file.

15. The method of claim 14, further comprising informing, by the first client, the filesystem server that the first client performed copy-on-write of the at least one block of data of the file, and responsive thereto, updating at least one of the read mapping table and the write mapping table for the file maintained by the filesystem server.

16. The method of claim 14, wherein the filesystem server prevents any client of the plurality of clients from performing copy-on-write over the at least one block of data of the file copy-on-write updated by the first client and the at least one other block of data of the file copy-on-write updated by the second client.

17. The method of claim 12, wherein a filesystem server of the client server environment is associated with at least one shared storage device containing the file, and wherein the method further comprises taking control of the file by the filesystem server to initiate the copy-on-write of the file, said initiating including updating a write mapping table for the file to be employed by said performing by the first client and said performing by the second client.

18. A method of facilitating a copy-on-write of a file within a client server environment, said method comprising:

controlling, from a filesystem server, implementation of a copy-on-write for a file stored in a shared storage unit of the client server environment, said controlling comprising allowing a first client of the client server environment to copy-on-write a portion of data in the file and allowing a second client of the client server environment to copy-on-write a different portion of the data in the file, wherein the filesystem server controls and facilitates performance of a distributed copy-on-write for the file.

19. The method of claim 18, wherein said controlling comprises taking control of the file by the filesystem server to initiate a copy-on-write of the file, said initiating including updating at least one mapping table for the file to be employed in performing the copy-on-write.

20. The method of claim 18, further comprising maintaining at the filesystem server, a read mapping table and a write mapping table for the file, wherein the read mapping table and the write mapping table are employed in performing the copy-on-write.

21. The method of claim 20, further comprising updating at least one of the read mapping table and the write mapping table for the file subsequent to performance of the copy-on-write.

22. The method of claim 18, wherein said controlling further comprises preventing, by the filesystem server, any additional updating on the portion of the data in the file copy-on-write updated by the first client or any additional updating of the different portion of the data in the file copy-on-write updated by the second client as part of the copy-on-write of the file.

23. A system for implementing a copy-on-write in a computing environment, said system comprising:
  (i) means for employing a first mapping table to perform a first virtual block to physical block mapping for use in reading a block of data of a file from physical storage for modification; and
  (ii) means for employing a second mapping table to perform a second virtual block to physical block mapping for use in writing a modified block of the data of the file to physical storage, wherein copy-on-write of the block of data is achieved using a single write operation.

24. The system of claim 23, wherein said first mapping table comprises a read mapping table and said second mapping table comprises a write mapping table, and wherein said write mapping table contains at least one virtual block mapped to a different physical block of the physical storage than the corresponding virtual block to physical block mapping of the read mapping table.

25. The system of claim 23, wherein the copy-on-write implementation further comprises means for initially determining whether a modification comprises a partial block write or a full block write, and if a partial block write, then for performing said employing of the first mapping table and said employing of the second mapping table, otherwise for performing said employing of the second mapping table without performing said employing of the first mapping table.

26. The system of claim 23, wherein said means for employing of the first mapping table comprises means for reading the block of data from physical storage into a buffer, and wherein said system further comprises means for modifying the block of data in the buffer before performing said employing of the second mapping table.

27. The system of claim 23, wherein the computing environment comprises a client server environment including a filesystem server and at least one client, and wherein said means for employing of the first mapping table and said means for employing of the second mapping table are performed by the at least one client of the client server environment.

28. The system of claim 27, wherein said means for employing of the first mapping table and said means for employing of the second mapping table performed by the at least one client further comprise means for making at least one call to the filesystem server to obtain at least one of the first mapping table and the second mapping table when performing copy-on-write of the block of data of the file.

29. The system of claim 27, further comprising means for updating the first mapping table after writing the modified block of data to physical storage, said means for updating including means for modifying at least one virtual block to physical block translation of the first mapping table to agree with a corresponding virtual block to physical block translation of the second mapping table.

30. The system of claim 23, wherein the computing environment comprises a computing unit and an external storage unit, the external storage unit comprising the physical storage, and wherein the means for employing of the first mapping table and the means for employing of the second mapping table are performed by the computing unit.

31. A system for facilitating a copy-on-write in a client server computer environment, said system comprising:
  means for maintaining at a file system server of the client server computing environment, a read mapping table and a write mapping table for a file; and
  wherein the read mapping table is usable to perform a first virtual block to physical block mapping for use in reading a block of data of the file from a physical storage for modification, and the write mapping table is usable to perform a second virtual block to physical block mapping for use in writing a modified block of the data of the file to physical storage, wherein using the read mapping table and the write mapping table, copy-on-write of a block of data is achievable using a single write operation.

32. The system of claim 31, wherein the write mapping table for the file contains at least one virtual block mapped to a different physical block of the physical storage than the corresponding virtual block to physical block translation of the read mapping table.

33. The system of claim 31, further comprising means for updating the read mapping table after a copy-on-write of a block of data of the file is performed, said means for updating including means for modifying at least one virtual block to physical block translation of the read mapping table to agree with a corresponding virtual block to physical block translation of the write mapping table.

34. A system of implementing a copy-on-write of a file within a client server environment having a plurality of clients, said system comprising:
  (i) means for performing, at a first client of the client server environment, copy-on-write of at least one block of data of the file to be copy-on-written; and
  (ii) means for performing, at a second client of the client server environment, copy-on-write of at least one other block of data of the file to be copy-on-written, wherein different portions of the copy-on-write of the file are performed by different clients of the plurality of clients in the client server environment.

35. The system of claim 34, wherein said means for performing at the first client comprises means for performing, by the first client, copy-on-write of the at least one block of data of the file using a single write operation, and wherein said means for performing at the second client comprises means for performing, by the second client, copy-on-write of the at least one other block of data using a single write operation.

36. The system of claim 35, wherein a filesystem server of the client server environment is associated with at least one shared storage device containing the file, and wherein the filesystem server maintains mapping tables for the file stored in the at least one shared storage device, and said means for performing at the first client comprises means for obtaining, by the first client, a read mapping table and a write mapping table for the file from the filesystem server, and for employing said read mapping table and said write mapping table in performing said copy-on-write of the at least one block of data of the file, and wherein said means for performing at the second client comprises means for obtaining, by the second client, the read mapping table and the write mapping table for the file from the filesystem server and for employing the read mapping table and the write mapping table in performing said copy-on-write of the at least one other block of data of the file.

37. The system of claim 36, further comprising means for informing, by the first client, the filesystem server that the first client performed copy-on-write of the at least one block of data of the file, and responsive thereto, for updating at least one of the read mapping table and the write mapping table for the file maintained by the filesystem server.

38. The system of claim 36, wherein the filesystem server prevents any client of the plurality of clients from performing copy-on-write over the at least one block of data of the file copy-on-write updated by the first client and the at least one other block of data of the file copy-on-write updated by the second client.

39. The system of claim 34, wherein a filesystem server of the client server environment is associated with at least one shared storage device containing the file, and wherein the system further comprises means for taking control of the file by the filesystem server to initiate the copy-on-write of the file, said means for initiating including means for updating a write mapping table for the file to be employed by said performing at the first client and said performing at the second client.

40. A system of facilitating a copy-on-write of a file within a client server environment, said system comprising:
means for controlling, from the filesystem server, implementation of a copy-on-write for a file stored in a shared storage unit of the client server environment, said means for controlling comprising means for allowing a first client of the client server environment to copy-on-write a portion of data in the file, and for allowing a second client of the client server environment to copy-on-write a different portion of the data in the file, wherein the filesystem server controls and facilitates performance of a distributed copy-on-write for the file.

41. The system of claim 40, wherein said means for controlling comprises means for taking control of the file by the filesystem server to initiate a copy-on-write of the file, said initiating including updating at least one mapping table for the file to be employed in performing the copy-on-write.

42. The system of claim 40, further comprising means for maintaining at the filesystem server, a read mapping table and a write mapping table for the file, wherein the read mapping table and the write mapping table are employed in performing the copy-on-write.

43. The system of claim 42, further comprising means for updating at least one of the read mapping table and the write mapping table for the file subsequent to performance of the copy-on-write.

44. The system of claim 40, wherein said means for controlling further comprises means for preventing, by the filesystem server, any additional updating on the portion of the data in the file copy-on-write updated by the first client or any additional updating of the different portion of the data in the file copy-on-write updated by the second client as part of the copy-on-write of the file of the file.

45. An article of manufacture, comprising:
at least one computer usable medium having computer readable program code logic to implement a copy-on-write in a computing environment, the computer readable program code logic comprising:
(i) logic to employ a first mapping table to perform a first virtual block to physical block mapping for use in reading a block of data of a file from physical storage for modification; and
(ii) logic to employ a second mapping table to perform a second virtual block to physical block mapping for use in writing a modified block of the data of the file to physical storage, wherein copy-on-write of the block of data is achieved using a single write operation.

46. The article of manufacture of claim 45, wherein the computing environment comprises a client server environment including a filesystem server and at least one client, and wherein said logic to employ the first mapping table and said logic to employ the second mapping table are performed by the at least one client of the client server environment.

47. The article of manufacture of claim 45, wherein said logic to employ the first mapping table and said employ the second mapping table performed by the at least one client further comprise logic to make at least one call to the filesystem server to obtain at least one of the first mapping table and the second mapping table when performing copy-on-write of the block of data of the file.

48. The article of manufacture of claim 45, wherein the computing environment comprises a computing unit and an external storage unit, the external storage unit comprising the physical storage, and wherein the logic to employ the first mapping table and the logic to employ the second mapping table are performed by the computing unit.

49. An article of manufacture, comprising:
at least one computer usable medium having computer readable program code logic to facilitate a copy-on-write in a client server computing environment, the computer readable program code logic comprising:
logic to maintain at a filesystem server of the client server computing environment a read mapping table and a write mapping table for a file, wherein the read mapping table is usable to perform a first virtual block to physical block mapping for use in reading a block of data of the file from a physical storage for modification, and the write mapping table is usable to perform a second virtual block to physical block mapping for use in writing a modified block of the data of the file to physical storage, wherein using the read mapping table and the write mapping table, copy-on-write of a block of data is achievable using a single write operation.

50. An article of manufacture, comprising:
at least one computer usable medium having computer readable program code logic to implement a copy-onwrite of a file within a client server environment having a plurality of clients, the computer readable program code logic comprising:

logic to perform a copy-on-write of a file using multiple clients of the client server environment, said logic to perform comprising:

(i) logic to perform, by a first client of the multiple clients, copy-on-write of at least one block of data of the file; and (ii) logic to perform, by a second client of the multiple clients, copy-on-write of at least one other block of data of the file.

51. The article of manufacture of claim 50, wherein said logic to perform by the first client comprises logic to perform, by the first client, copy-on-write of the at least one block of data of the file using a single write operation, and wherein said logic to perform by the second client comprises logic to perform, by the second client, copy-on-write of the at least one other block of data using a single write operation.

52. The article of manufacture of claim 51, wherein a filesystem server of the client server environment is associated with at least one shared storage device containing the file, and wherein the filesystem server maintains mapping tables for the file stored in the at least one shared storage device, and said logic to perform by the first client comprises logic to obtain, by the first client, a read mapping table and a write mapping table for the file from the filesystem server, and to employ said read mapping table and said write mapping table in performing said copy-on-write of the at least one block of data of the file, and wherein said logic to perform by the second client comprises logic to obtain, by the second client, the read mapping table and the write mapping table for the file from the filesystem server and to employ the read mapping table and the write mapping table in performing said copy-on-write of the at least one other block of data of the file.

53. An article of manufacture, comprising:

at least one computer usable medium having computer readable program code logic to facilitate a copy-on-write of a file within a client server environment, the computer readable program code logic comprising:

logic to control, from a filesystem server, implementation of a copy-on-write for a file stored in a shared storage unit of the client server environment, said logic to control comprising logic to allow a first client of the client server environment to copy-on-write a portion of data in the file and logic to allow a second client of the client server environment to copy-on-write a different portion of the data in the file, wherein the filesystem server controls and facilitates performance of a distributed copy-on-write for the file.

54. The article of manufacture of claim 53, wherein said logic to control comprises logic to take control of the file by the filesystem server to initiate a copy-on-write of the file, said initiating including updating at least one mapping table for the file to be employed in performing the copy-on-write.

55. The article of manufacture of claim 53, further comprising logic to maintain at the filesystem server, a read mapping table and a write mapping table for the file, wherein the read mapping table and the write mapping table are employed in performing the copy-on-write.

* * * * *

UNITED STATES PATENT AND TRADEMARK OFFICE
CERTIFICATE OF CORRECTION

| | |
|---|---|
| PATENT NO. | : 7,085,909 B2 |
| APPLICATION NO. | : 10/427403 |
| DATED | : August 1, 2006 |
| INVENTOR(S) | : Ananthanarayanan et al. |

It is certified that error appears in the above-identified patent and that said Letters Patent is hereby corrected as shown below:

Col. 7, line 25, delete "111" and insert --11--

Col. 13, line 32, delete the word "bock" and insert --block--

Col. 13, Table, delete the word "frome" and insert --from--

Signed and Sealed this

Twenty-first Day of November, 2006

JON W. DUDAS
*Director of the United States Patent and Trademark Office*